(12) United States Patent (10) Patent No.: US 12,114,024 B2
Sharma (45) Date of Patent: Oct. 8, 2024

(54) STREAMING VIDEO WITH INTERNALLY-VARIABLE FRAME QUALITY BASED ON INTELLIGENT IDENTIFICATION OF HIGH-RELEVANCE REGIONS

(71) Applicant: Microsoft Technology Licensing, LLC, Redmond, WA (US)

(72) Inventor: Mrinal Kumar Sharma, Hazaribagh (IN)

(73) Assignee: Microsoft Technology Licensing, LLC., Redmond, WA (US)

( * ) Notice: Subject to any disclaimer, the term of this patent is extended or adjusted under 35 U.S.C. 154(b) by 0 days.

(21) Appl. No.: 17/744,911

(22) Filed: May 16, 2022

(65) Prior Publication Data

US 2023/0370653 A1 Nov. 16, 2023

(51) Int. Cl.
*H04N 21/234* (2011.01)
*G06V 10/22* (2022.01)
(Continued)

(52) U.S. Cl.
CPC ....... *H04N 21/23418* (2013.01); *G06V 10/22* (2022.01); *G06V 10/82* (2022.01);
(Continued)

(58) Field of Classification Search
CPC .......... H04N 21/23418; H04N 19/167; H04N 19/169; H04N 19/17; H04N 19/176;
(Continued)

(56) References Cited

U.S. PATENT DOCUMENTS 6,343,141 B1 1/2002 Okada et al.
8,351,513 B2 1/2013 Wen et al.
(Continued)

FOREIGN PATENT DOCUMENTS

CN 113038127 A 6/2021

OTHER PUBLICATIONS

Cetinkaya, et al., "Fast Multi-Resolution and Multi-Rate Encoding for HTTP Adaptive Streaming Using Machine Learning", In IEEE Open Journal of Signal Processing, vol. 2, May 10, 2021, pp. 484-495.

(Continued)

*Primary Examiner* — John R Schnurr
(74) *Attorney, Agent, or Firm* — Foley IP Law, PLLC

(57) ABSTRACT

A method for streaming videos with internally-variable frame quality is implemented via a computing system including a processor. The method includes accessing a video including and evenly sampling the video frames. The method includes, for each sampled video frame, analyzing the video frame using a CNN model to determine whether the video frame includes high-relevance region(s). The method also includes, for each sampled video frame including high-relevance region(s), extracting coordinates of the high-relevance region(s) using the CNN model, and for each sampled video frame including high-relevance region(s) and each intervening video frame between the sampled video frame and a next sampled video frame, setting a minimum frame quality for the extracted coordinates. The method further includes streaming the video with internally-variable frame quality by buffering the extracted coordinates within the video frames with the minimum frame quality, while buffering remaining coordinates within the video frames with a lower frame quality.

20 Claims, 8 Drawing Sheets

(51) Int. Cl.

| | |
|---|---|
| *G06V 10/82* | (2022.01) |
| *G06V 20/40* | (2022.01) |
| *H04N 19/167* | (2014.01) |
| *H04N 19/169* | (2014.01) |
| *H04N 19/17* | (2014.01) |
| *H04N 19/176* | (2014.01) |
| *H04N 21/2187* | (2011.01) |
| *H04N 21/2343* | (2011.01) |
| *H04N 21/472* | (2011.01) |

(52) U.S. Cl.
CPC .............. *G06V 20/41* (2022.01); *G06V 20/46* (2022.01); *H04N 19/167* (2014.11); *H04N 19/169* (2014.11); *H04N 19/17* (2014.11); *H04N 19/176* (2014.11); *H04N 21/2187* (2013.01); *H04N 21/23406* (2013.01); *H04N 21/234345* (2013.01); *H04N 21/472* (2013.01)

(58) Field of Classification Search
CPC ......... H04N 21/2187; H04N 21/23406; H04N 21/234345; H04N 21/472; G06V 10/22; G06V 10/82; G06V 20/41; G06V 20/46
See application file for complete search history.

(56) References Cited

U.S. PATENT DOCUMENTS

| | | | |
|---|---|---|---|
| 8,396,114 | B2 | 3/2013 | Gu et al. |
| 9,584,710 | B2 | 2/2017 | Marman et al. |
| 10,789,527 | B1 | 9/2020 | Raichelgauz et al. |
| 2008/0043832 | A1 | 2/2008 | Barkley et al. |
| 2010/0098162 | A1 | 4/2010 | Lu et al. |
| 2017/0339417 | A1* | 11/2017 | Puri .................... G06F 18/2178 |
| 2018/0268571 | A1* | 9/2018 | Park ..................... H04N 19/189 |
| 2019/0228253 | A1* | 7/2019 | Ramaswamy ... H04N 21/85406 |
| 2021/0168408 | A1 | 6/2021 | Malakhov et al. |
| 2021/0352307 | A1* | 11/2021 | Bae ........................ H04N 19/17 |
| 2021/0383120 | A1* | 12/2021 | Zhou ...................... G06T 7/248 |
| 2022/0224917 | A1* | 7/2022 | Ohashi .................. H04N 23/73 |
| 2023/0115097 | A1* | 4/2023 | Asokan ................ G06V 40/171 |
| | | | 375/240.24 |

OTHER PUBLICATIONS

Ding, et al., "Advances in Video Compression System Using Deep Neural Network: A Review and Case Studies", In Proceedings of the IEEE, vol. 109, Issue 9, Sep. 2021, pp. 1494-1520.

Grois, et al., "Efficient Region-of-Interest Scalable Video Coding with Adaptive Bit-Rate Control", In Journal of Advances in Multimedia, Nov. 4, 2013, pp. 1-17.

Naik, et al., "Semantic Context Driven Language Descriptions of Videos Using Deep Neural Network", In Journal of Big Data, vol. 9, Issue 1, Article No. 17, Feb. 10, 2022, pp. 1-22.

Dror, et al., "Content Adaptive Video Compression for Autonomous Vehicle Remote Driving", In Proceedings of the Applications of Digital Image Processing XLIV, Aug. 1, 2021, 11 Pages.

Girshick, et al., "Rich Feature Hierarchies for Accurate Object Detection and Semantic Segmentation", In Proceedings of the IEEE Conference on Computer Vision and Pattern Recognition, Jun. 23, 2014, 8 Pages.

"International Search Report and Written Opinion Issued in PCT Application No. PCT/US23/013451", Mailed Date: May 24, 2023, 14 Pages.

Redmon, et al., "You Only Look Once: Unified, Real-Time Object Detection", In Proceedings of IEEE Conference on Computer Vision and Pattern Recognition, Jun. 27, 2016, pp. 779-788.

\* cited by examiner

STREAMING VIDEO WITH INTERNALLY-VARIABLE FRAME QUALITY BASED ON INTELLIGENT IDENTIFICATION OF HIGH-RELEVANCE REGIONS

BACKGROUND

The present disclosure relates to video streaming applications. In particular, the present disclosure relates to streaming a video with internally-variable frame quality based on the intelligent identification of one or more high-relevance regions within the video.

SUMMARY

The following presents a simplified summary in order to provide a basic understanding of some aspects described herein. This summary is not an extensive overview of the claimed subject matter. This summary is not intended to identify key or critical elements of the claimed subject matter nor delineate the scope of the claimed subject matter. This summary's sole purpose is to present some concepts of the claimed subject matter in a simplified form as a prelude to the more detailed description that is presented later.

In an embodiment described herein, a method for streaming a video with internally-variable frame quality is described. The method is implemented via a computing system including a processor. The method includes accessing, via the processor, a video including video frames and evenly sampling the video frames. The method includes, for each sampled video frame, analyzing the sampled video frame using a convolutional neural network (CNN) model to determine whether the sampled video frame includes any high-relevance region(s), where the CNN model is configured to intelligently identify high-relevance region(s) based on a relative likelihood of each region of the sampled video frame being more relevant to a user than other regions of the sampled video frame. The method also includes, for each sampled video frame including high-relevance region(s), extracting coordinates of the high-relevance region(s) using the CNN model, and for each sampled video frame including high-relevance region(s) and each intervening video frame between the sampled video frame and a next sampled video frame, setting a minimum frame quality for the extracted coordinates. The method further includes streaming the video with an internally-variable frame quality by buffering the extracted coordinates within the video frames with the minimum frame quality, while buffering the remaining coordinates within the video frames with a lower frame quality.

In another embodiment, a computing system is described. The computing system includes a processor and a computer-readable storage medium operatively coupled to the processor. The computer-readable storage medium includes computer-executable instructions that, when executed by the processor, cause the processor to access a video including video frames and evenly sample the video frames. The computer-executable instructions, when executed by the processor, cause the processor to, for each sampled video frame, analyze the sampled video frame using a CNN model to determine whether the sampled video frame includes high-relevance region(s), where the CNN model is configured to intelligently identify high-relevance region(s) based on a relative likelihood of each region of the sampled video frame being more relevant to other regions of the sampled video frame. The computer-executable instructions, when executed by the processor, also cause the processor to, for each sampled video frame including high-relevance region(s), extract coordinates of the high-relevance region(s) using the CNN model, and for each sampled video frame including high-relevance region(s) and each intervening video frame between the sampled video frame and a next sampled video frame, set a minimum frame quality for the extracted coordinates. The computer-executable instructions, when executed by the processor, further cause the processor to stream the video with an internally-variable frame quality by buffering the extracted coordinates within the video frames with the minimum frame quality, while buffering the remaining coordinates within the video frames with a lower frame quality.

In another embodiment, a computer-readable storage medium is described. The computer-readable storage medium includes computer-executable instructions that, when executed by a processor, cause the processor to access a video including video frames and evenly sample the video frames. The computer-executable instructions, when executed by the processor, also cause the processor to, for each sampled video frame, analyze the sampled video frame using a CNN model to determine whether the sampled video frame includes high-relevance region(s), where the CNN model is configured to intelligently identify high-relevance region(s) based on a relative likelihood of each region of the sampled video frame being more relevant to a user than other regions of the sampled video frame. The computer-executable instructions, when executed by the processor, also cause the processor to, for each sampled video frame including high-relevance region(s), extract coordinates of the high-relevance region(s) using the CNN model, and for each sampled video frame including high-relevance region(s) and each intervening video frame between the sampled video frame and a next sampled video frame, set a minimum frame quality for the extracted coordinates. The computer-executable instructions, when executed by the processor, further cause the processor to stream the video with an internally-variable frame quality by buffering the extracted coordinates within the video frames with the minimum frame quality, while buffering remaining coordinates within the video frames with a lower frame quality.

The following description and the annexed drawings set forth in detail certain illustrative aspects of the claimed subject matter. These aspects are indicative, however, of a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

BRIEF DESCRIPTION OF THE DRAWINGS

The following detailed description may be better understood by referencing the accompanying drawings, which contain specific examples of numerous features of the disclosed subject matter.

DETAILED DESCRIPTION

Over the past few years, the importance of video content as a source of information has exponentially increased for virtually every segment of users across the globe. One of the major factors that has contributed to the rise of video content is the development of a plethora of computing systems across multiple platforms that have the capability to support digital media as one of the key formats. As a result, users are now generally able to access video content at any point in time, regardless of their location. Moreover, the videos accessed by users span across a broad range of categories, including, for example, educational categories, entertainment categories, and product or tutorial-based categories. Furthermore, in conjunction with the general rise in the importance of video content, various video platforms have gained wide acceptance among users. However, such video platforms could still benefit from improvements in terms of controlling the quality of the streamed video content. In particular, users are not merely concerned with the ability to consume video content but are also concerned with the quality of such video content. For example, video that is streamed at high resolution (e.g., 1080p) provides users with a seamless viewing experience, while video that is streamed at low resolution (e.g., 144p) provides users with a severely degraded viewing experience in which the user may not be able to discern particular details within the video. However, this issue is complicated by the tradeoff between video quality and internet consumption, with higher-quality videos consuming much larger amounts of internet data as compared to lower-quality videos. Therefore, users are consistently forced to choose between consuming a large amount of internet data by viewing higher-quality videos or conserving internet data by viewing lower-quality videos that are lacking in detail.

Figure 1A:
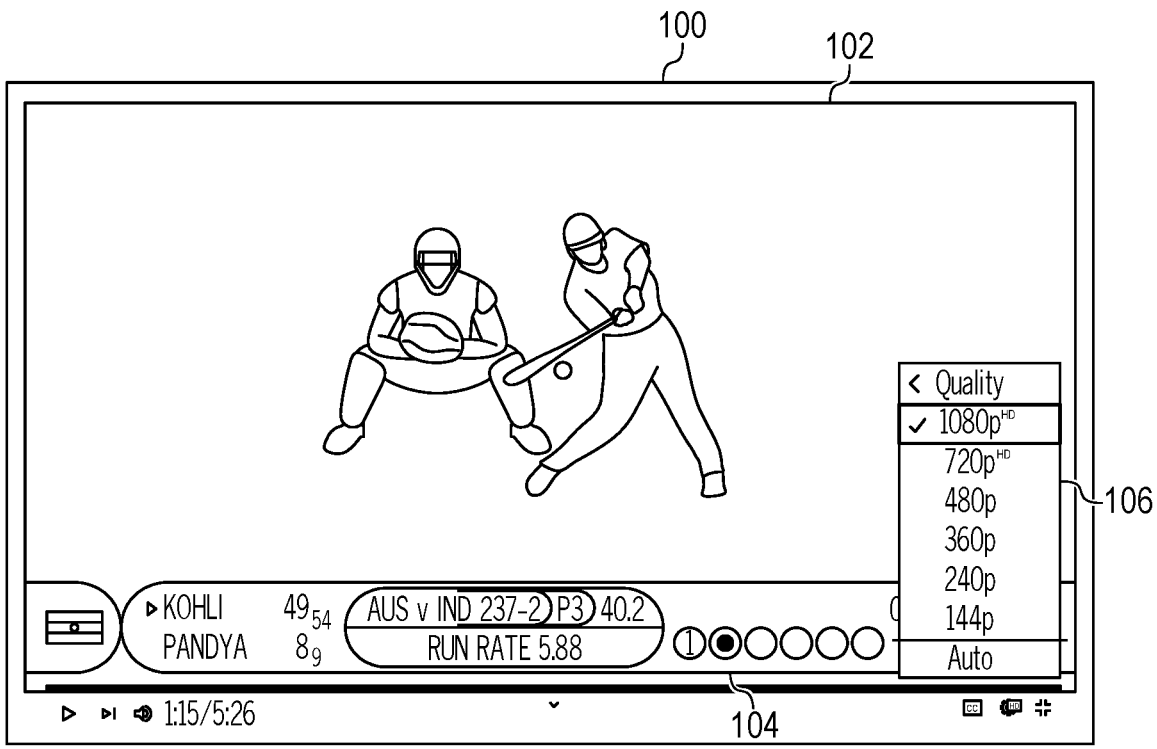
FIG. 1A is a schematic view of a video GUI surfacing an exemplary video frame from a live cricket match video streamed with a frame quality of 1080p.
Figure 1B:
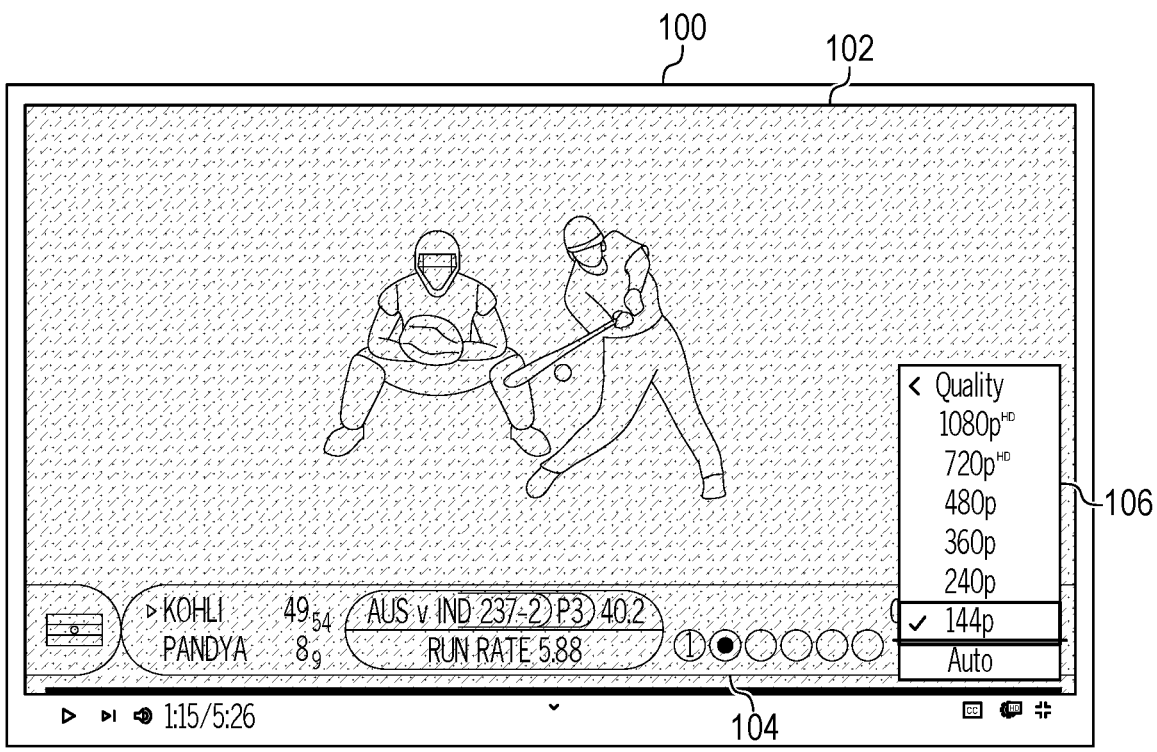
FIG. 1B is a schematic view of the video GUI surfacing the exemplary video frame of FIG. 1A streamed with a frame quality of 144p.

As a more specific example, consider a case where a user is traveling and simultaneously streaming a live video of a cricket match on his mobile computing system via a particular video platform. In this example, the user has a limited internet data plan, with an upper limit of 1.5 Gigabytes (Gb)/day for his mobile computing system. Therefore, watching the live broadcasting of the cricket match at high resolution (e.g., 1080p) would consume his daily allotment of internet data within a few hours. As a result, the user may resort to lowering the frame quality to 144p to conserve internet data, thus allowing the user to stream the cricket match for a few extra hours. This example is depicted in FIGS. 1A and 1B. In particular, FIG. 1A is a schematic view of a video GUI 100 surfacing an exemplary video frame 102 from a live cricket match video streamed with a frame quality of 1080p, while FIG. 1B is a schematic view of the video GUI 100 surfacing the exemplary video frame 102 of FIG. 1A streamed with a frame quality of 144p. As shown in FIG. 1A, when the user selects 1080p as the desired frame quality, the video frame 102 is buffered with high resolution. As a result, the user is able to easily discern the content within the entire video frame 102, including the match statistics displayed in a live scoreboard region 104 along the bottom of the video frame 102. However, watching the video with such high quality consumes a large amount of internet data and can become quite expensive depending on the limits of the user's internet data plan.

As shown in FIG. 1B, when the user selects 144p as the desired frame quality, the video frame 102 is buffered with low resolution, and the video frame 102 therefore becomes highly pixelated and lacking in detail. In particular, when the frame quality is set so low, it becomes difficult (if not impossible) for the user to discern the textual information included in the live scoreboard region 104 along the bottom of the video frame 102. This is especially problematic because the information in the live scoreboard region 104 is likely to be more relevant or important to the user than the rest of the video frame 102. Therefore, it would be beneficial if the video streaming application could buffer the overall video frame 102 with relatively low frame quality while still maintaining relatively high frame quality for the live scoreboard region 104. However, conventional video streaming applications and video platforms do not support this functionality.

In particular, conventional video streaming applications generally provide several different frame quality modes, including an automatic frame quality mode. When the automatic frame quality mode is activated, the video streaming applications automatically set the frame quality for the videos based on the current internet speed and data plan limitations. As an example, if the internet connection is poor or the user has a limited amount of internet data, the video streaming application will automatically set the frame quality to be relatively low (e.g., 144p). On the other hand, if the internet connection is strong and the user has a large amount internet data, the video streaming application will automatically set the frame quality to be relatively high (e.g., 720p). However, when the frame quality is set to be relatively low, the video streaming application streams the entire video at such low quality without making any determinations or adjustments for the portions of the video that are most relevant or important to the user. As a result, the user's entire viewing experience is degraded, often resulting in the inability to effectively consume all the relevant information within the video.

Therefore, the present techniques address these and other issues by providing for the streaming of a video with internally-variable frame quality based on the intelligent identification of one or more high-relevance regions within the video. In particular, such internally-variable video frame quality techniques involve analyzing video frames to intelligently identify and extract the location of one or more high-relevance regions within the video frames using a neural network model, such as a region-based convolutional neural network (R-CNN) model, as described further herein. A minimum frame quality is then set for the high-relevance region(s) to ensure that the high-relevance region(s) remain clearly and easily visible while the video is streamed, as also described further herein.

In various embodiments, the internally-variable video frame quality techniques described herein are implemented by one or more servers operated by the application service provider that provides for the execution of the video streaming application (or optionally an entire platform of such applications) on various remote computing systems. As a result, when the server(s) receive input from the user of a remote computing system (e.g., through a video graphical user interface (GUI) that is provided by a particular video streaming application) indicating a desire to activate an internally-variable frame quality mode, the server(s) may automatically analyze the video frames in real-time to intelligently identify and extract the location of the high-relevance region(s) within the video frames and may then stream the video on the remote computing system with internally-variable frame quality based on the minimum frame quality for the high-relevance region(s). Additionally or alternatively, if the video is a pre-recorded video rather than a live or real-time video stream, the server(s) may pre-analyze such video frames and save the video with the internally-variable frame quality for subsequent streaming.

In some embodiments, the internally-variable frame quality mode described herein is provided as an option along with other conventional frame quality modes, such as 144p mode, 240p mode, 360p mode, 480p mode, 720p mode, 1080p mode, and automatic mode. Such conventional frame quality modes are illustrated by FIGS. 1A and 1B, which depict a conventional GUI element 106 that enables the user to select a desired frame quality mode for the video streaming application. Moreover, FIG. 1D depicts a novel GUI element 108 that enables the user to select the internally-variable frame quality mode described herein, in addition to the conventional frame quality modes provided by the conventional GUI element 106. In other embodiments, the internally-variable frame quality mode is automatically initiated by the video streaming application when one or more high-relevance region(s) are identified within a video that is streaming with a relatively low frame quality. In such embodiments, the video streaming application may optionally include a user-selectable on/off mechanism for activating/deactivating the internally-variable frame quality functionality.

Figure 1C:
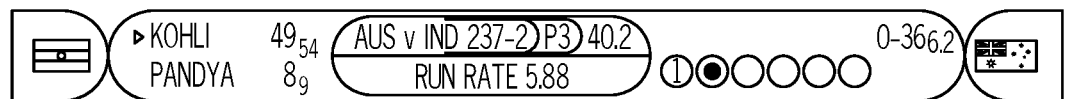
FIG. 1C is a schematic view of the live scoreboard region of the video frame of FIGS. 1A and 1B, which is intelligently identified as being a high-relevance region of the video frame according to embodiments described herein.
Figure 1D:
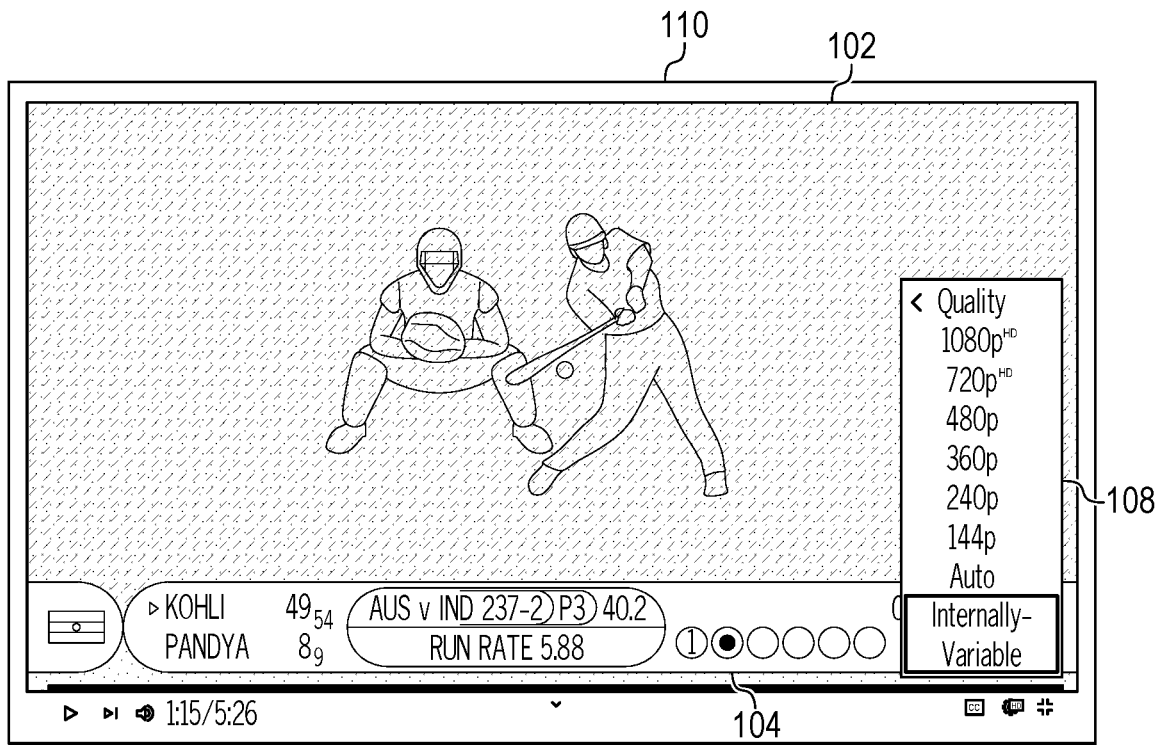
FIG. 1D is a schematic view of a video GUI surfacing the exemplary video frame of FIGS. 1A and 1B streamed with internally-variable frame quality based on the intelligent identification of the high-relevance region, as described with respect to FIG. 1C.

Continuing with the example above, exemplary advantages provided by the present techniques are depicted in FIGS. 1C and 1D. In particular, FIG. 1C is a schematic view of the live scoreboard region 104 of the video frame 102 of FIGS. 1A and 1B, which is intelligently identified as being a high-relevance region of the video frame 102 according to embodiments described herein. As shown in FIG. 1C, the live scoreboard region 104 is automatically extracted from the video frame 102 based on the rectangle coordinates of the live scoreboard region 104 within the overall video frame 102.

FIG. 1D is a schematic view of a video GUI 110 surfacing the exemplary video frame 102 of FIGS. 1A and 1B streamed with internally-variable frame quality based on the intelligent identification of the high-relevance region, as described with respect to FIG. 10. Specifically, the present techniques enable the live scoreboard region 104 to be streamed at a higher frame quality (e.g., 720p) to ensure that relevant or important details of the video are fully visible, while allowing the other regions of the video frame 102 to be streamed at the lower frame quality (e.g., 144p) to conserve the user's internet data.

Figure 2A:
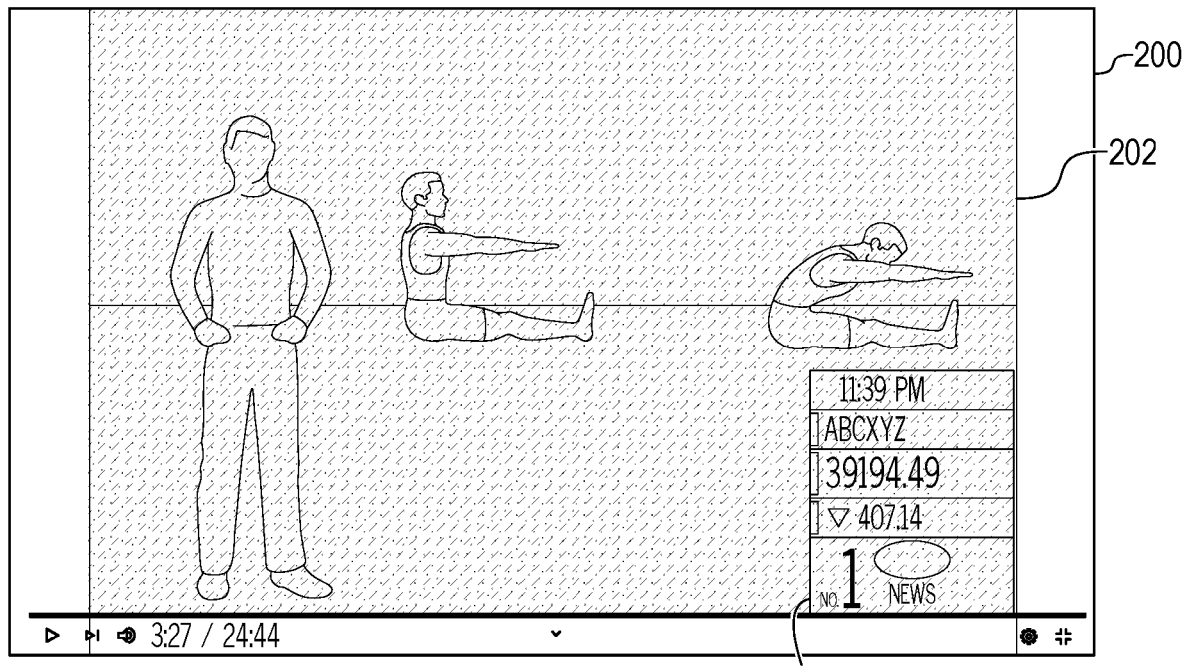
FIG. 2A is a schematic view of a video GUI surfacing an exemplary video frame from a news channel video streamed with a frame quality of 144p.
Figure 2B:
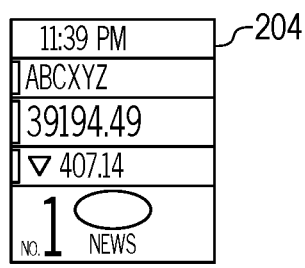
FIG. 2B is a schematic view of the statistical news data region of the video frame of FIG. 2A, which is intelligently identified as being a high-relevance region of the video frame according to embodiments described herein.
Figure 2C:
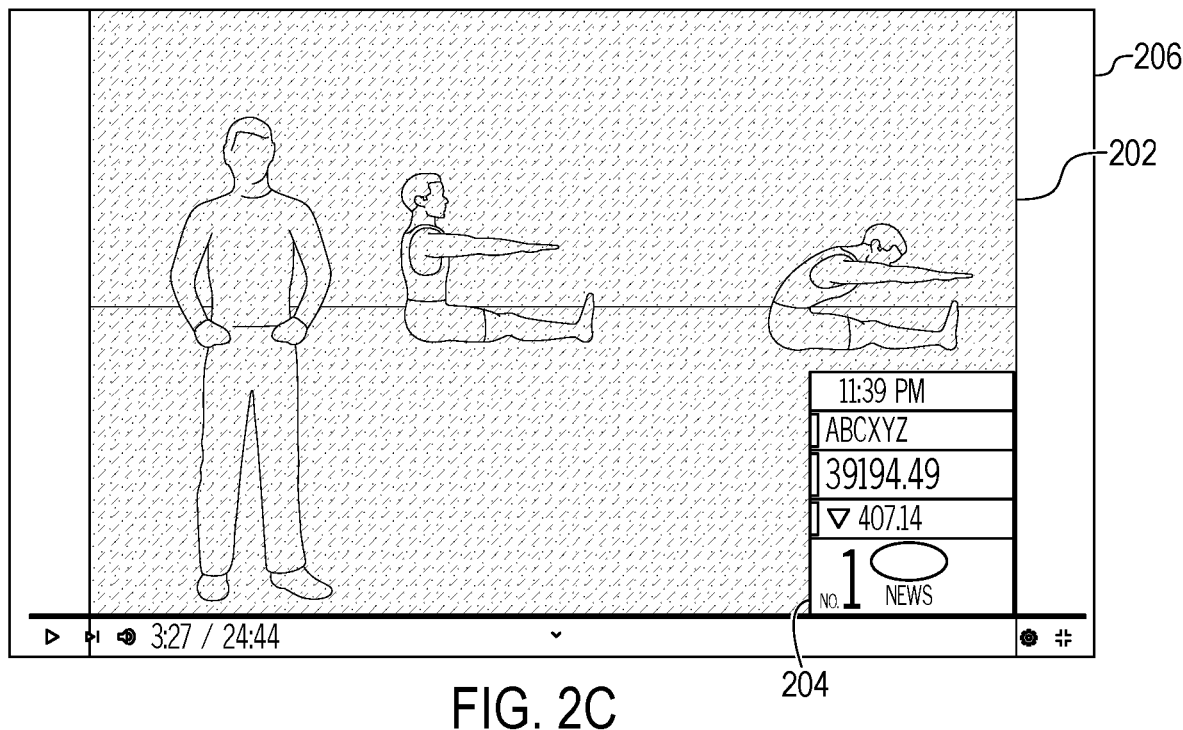
FIG. 2C is a schematic view of a video GUI surfacing the exemplary video frame of FIG. 2A streamed with internally-variable frame quality based on the intelligent identification of the high-relevance region, as described with respect to FIG. 2B.

Another example of the present techniques is depicted by FIGS. 2A, 2B, and 2C. Specifically, FIG. 2A is a schematic view of a video GUI 200 surfacing an exemplary video frame 202 from a news channel video streamed with a frame quality of 144p. As shown in FIG. 2A, when the frame quality is set so low, it becomes difficult (if not impossible) for the user to discern the textual information included in a statistical news data region 204 along the bottom of the video frame 202. This is especially problematic because the information in the statistical news data region 204 is likely to be more relevant or important to the user than the rest of the video frame 202.

FIG. 2B is a schematic view of the statistical news data region 204 of the video frame 202 of FIG. 2A, which is intelligently identified as being a high-relevance region of the video frame 202 according to embodiments described herein. As shown in FIG. 2B, the statistical news data region 204 is automatically extracted from the video frame 202 based on the rectangle coordinates of the statistical news data region 204 within the overall video frame 202. Furthermore, FIG. 2C is a schematic view of a video GUI 206 surfacing the exemplary video frame 202 of FIG. 2A streamed with internally-variable frame quality based on the intelligent identification of the high-relevance region, as described with respect to FIG. 2B. Specifically, the present techniques enable the statistical news data region 204 to be streamed at a higher frame quality (e.g., 720p) to ensure that highly-relevant details of the video are fully visible, while allowing the other regions of the video frame 202 to be streamed at the lower frame quality (e.g., 144p) to conserve the user's internet data.

Those skilled in the art will appreciate that the exemplary implementations of the internally-variable video frame quality techniques described with respect to FIGS. 1A-D and 2A-C are for illustrative purposes only. In practice, the techniques described herein may be implemented in any other suitable manner to achieve any other suitable results, depending on the details of the particular implementation. In particular, the present techniques may be used to increase the viewability of any number of different types of high-relevance regions within video frames. As a non-limiting example, the present techniques may be used to ensure that subtitles or closed captions remain easily discernable within videos regardless of the overall frame quality. Furthermore, the present techniques may be advantageous, not only for mobile users with limited data plans, but also for desktop users with low internet speeds. More generally speaking, the present techniques are advantageous for any applications in which video frames include particular regions or portions that are of higher relevance to the user as compared to other regions or portions of the video frames.

As a preliminary matter, some components shown in the figures are described herein in the context of one or more structural components, referred to as functionalities, modules, features, elements, etc. However, the components shown in the figures can be implemented in any manner, for example, by software, hardware (e.g., discrete logic components, etc.), firmware, and so on, or any combination of these implementations. In one embodiment, the various components may reflect the use of corresponding components in an actual implementation. In other embodiments, any single component illustrated in the figures may be implemented by a number of actual components. The depiction of any two or more separate components in the figures may reflect different functions performed by a single actual component.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into plural component blocks, and certain blocks can be performed in an order that differs from that which is illustrated herein, including a parallel manner of performing the blocks. The blocks shown in the flowcharts can be implemented by software, hardware, firmware, and the like, or any combination of these implementations. As used herein, hardware may include computing systems, discrete logic components, such as application specific integrated circuits (ASICs), and the like, as well as any combinations thereof.

As for terminology, the phrase "configured to" encompasses any way that any kind of structural component can be constructed to perform an identified operation. The structural component can be configured to perform an operation using software, hardware, firmware and the like, or any combinations thereof. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware.

The term "logic" encompasses any functionality for performing a task. For instance, each operation illustrated in the flowcharts corresponds to logic for performing that operation. An operation can be performed using software, hardware, firmware, etc., or any combinations thereof.

As utilized herein, the terms "component," "system," "client," and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any tangible, computer-readable storage medium.

Moreover, as used herein, the term "computer-readable storage medium" refers to an article of manufacture. In general, computer-readable storage media are used to host, store and/or reproduce computer-executable instructions and data for later retrieval and/or execution. When the computer-executable instructions that are hosted or stored on the computer-readable storage media are executed by a processor of a computing system, the execution thereof causes, configures and/or adapts the executing computing system to carry out various steps, processes, routines, methods and/or functionalities, including the steps, processes, routines, methods, and/or functionalities described herein. Examples of computer-readable storage media include, but are not limited to, optical storage media (such as Blu-ray discs, digital video discs (DVDs), compact discs (CDs), optical disc cartridges, and the like), magnetic storage media (such as hard disk drives, floppy disks, magnetic tape, and the like), memory storage devices (such as random access memory (RAM), read-only memory (ROM), memory cards, thumb drives, and the like), and cloud storage (such as online storage services). Computer-readable storage media may deliver computer-executable instructions to a computing system for execution via various transmission means and mediums, including carrier waves and/or propagated signals. However, for purposes of this disclosure, the term "computer-readable storage medium (or media)" refers specifically to non-transitory forms of computer-readable storage media and expressly excludes carrier waves and/or propagated signals.

As used herein, the term "high-relevance region," when used in reference to a video frame, refers to a region of the video frame that has been determined likely to be of high relevance or importance to the user as compared to other regions of the video frame. Moreover, as described herein, such determination is made with the aid of one or more machine learning techniques (e.g., using one or more neural network models). Furthermore, each high-relevance region may be identified within the corresponding video frame based on the coordinates (e.g., rectangle or square coordinates) of such high-relevance region with respect to the overall video frame.

As used herein, the term "frame quality," when used with reference to a video frame, refers to the resolution of the video frame. As an example, a video frame with a resolution of 1920×1080 pixels has a frame quality of 1080p. Moreover, as used herein, the term "internally-variable frame quality," when used with reference to a video frame, means that the video frame includes multiple different frame qualities for different regions or portions of the video frame. As a non-limiting example, a video frame with an internally-variable frame quality may include one or more regions having a resolution of 720p and one or more other regions having a resolution of 144p.

As used herein, the term "intelligent," when used with reference to the identification of high-relevance regions of video frames, refers to the utilization of machine learning techniques for the detection and extraction of such high-relevance region(s). As an example, in various embodiments, one or more neural network models (such as a convolutional neural network (CNN) model or, more specifically, a region-based CNN (R-CNN) model) are used to "intelligently" identify such high-relevance region(s). As a result, those skilled in the art will appreciate that the intelligent identification process described herein is a complex computing task that cannot be practically performed in the human mind.

As used herein, the term "video streaming application" refers to any application that supports video streaming, regardless of whether the primary purpose of the application relates to video streaming. As will be appreciated by those skilled in the art, the term therefore encompasses a wide range of applications, including, for example, typical video streaming applications that are intended primarily for streaming movies, shows, and/or other types of videos, social media applications, networking applications, communication applications, entertainment applications, gaming applications, and the like. Moreover, the term "video platform" is used herein to refer to one or more video streaming applications that are provided by a particular application service provider. As a non-limiting example, if the application service provider is Microsoft Corporation, the video streaming application described herein may include (but is not limited to) any Microsoft application that includes video streaming capabilities, including (but not limited to) Microsoft® Teams®, Microsoft® Viva®, Microsoft® SharePoint®, and/or Microsoft® Yammer® (among others). In this example, all such Microsoft applications (or some subset thereof) may be collectively referred to as a single video platform.

Figure 3:
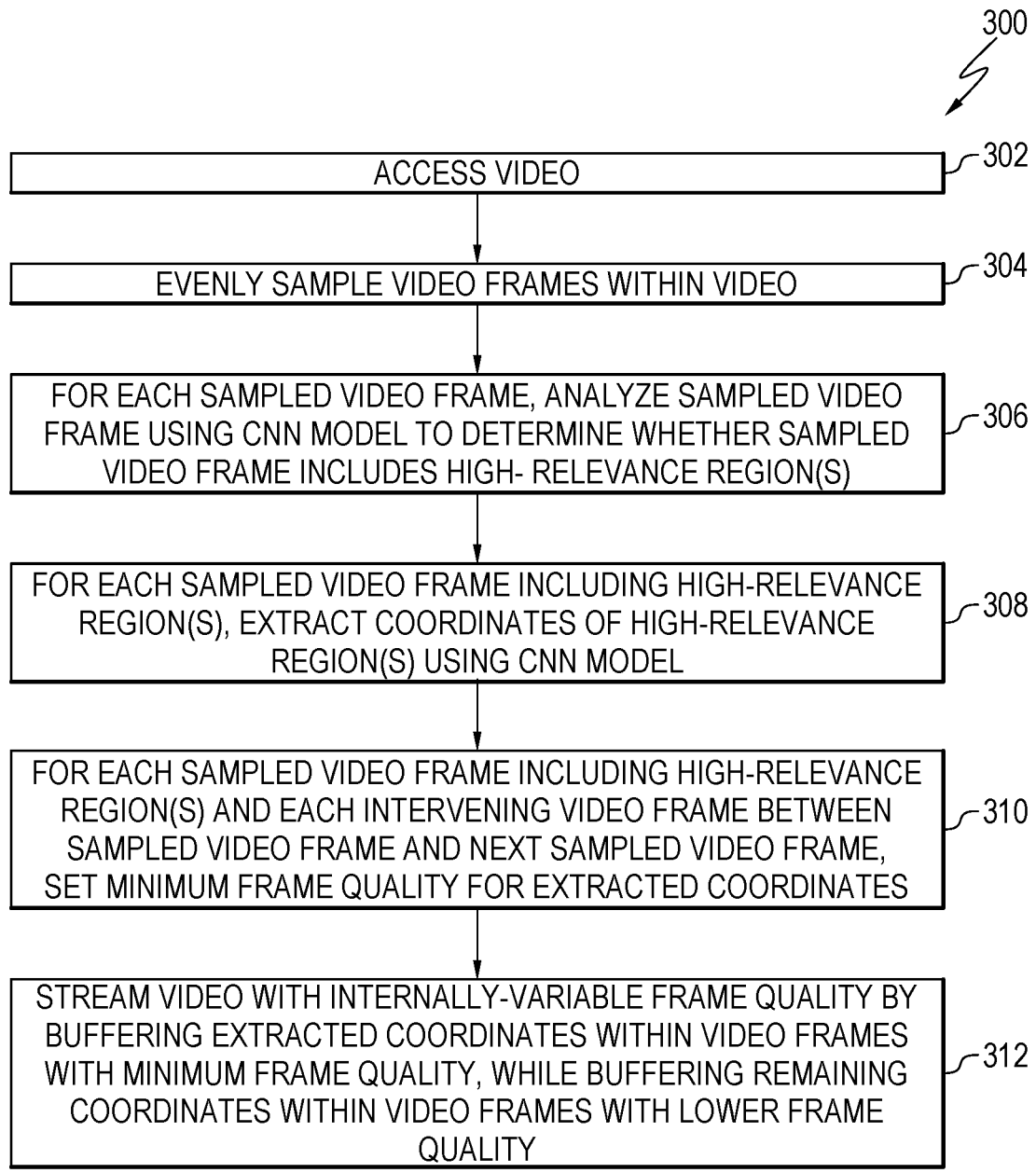
FIG. 3 is a process flow diagram of a method for streaming a video with internally-variable frame quality based on the intelligent identification of one or more high-relevance regions within the corresponding video frames according to embodiments described herein.

Turning now to additional details of the present techniques, FIG. 3 is a process flow diagram of an exemplary method 300 for streaming a video with internally-variable frame quality based on the intelligent identification of one or more high-relevance regions within the corresponding video frames according to embodiments described herein. The method 300 is executed via one or more computing systems, such as the exemplary computing system described with respect to FIG. 4. In particular, in various embodiments, the computing system(s) implementing the method 300 include computing system(s) or server(s) that are run by an application service provider that provides for the execution of one or more video streaming applications on various remote computing systems. The computing system(s) include one or more processors and one or more computer-readable storage media including computer-executable instructions that, when executed by the processor(s), cause the processor(s) to perform the blocks of the method 300. An exemplary embodiment of such computer-readable storage media is described with respect to FIG. 6. Moreover, in various embodiments, the method 300 is executed within the context of a network environment including one or more application service provider computing system(s)/server(s), as described further with respect to the exemplary network environment of FIG. 5.

According to embodiments described herein, when a video has been uploaded to the application service provider computing system(s)/server(s), one or more high-relevance regions within the corresponding video frames are intelligently identified using an R-CNN model. Specifically, the R-CNN model analyzes and extracts the coordinates (e.g., rectangle or square coordinates) of the high-relevance region(s). The location(s) of such high-relevance region(s) are then marked or flagged by the R-CNN model. The video stored with respect to the computing system(s)/server(s) is then updated to include the high-relevance region(s) of the frames in relatively high quality and the other regions of the frames in relatively low quality. Then, if the user of the remote computing system executing the video streaming application selects internally-variable frame quality mode in the video options, the video is automatically streamed with the internally-variable frame quality. Alternatively, in some embodiments, the video is steamed live or in real-time without first being updated and saved with respect to the computing system(s)/server(s).

Turning now to the details of the method 300, the method 300 begins at block 302, at which a video is accessed by the computing system. For example, in some embodiments, the video is uploaded to the computing system via a network. Moreover, the video may be a pre-recorded video that is uploaded to the computing system for future streaming, or the video may be a live video that is expected to be streamed in real-time.

At block 304, the video frames within the video are evenly sampled, where the term "evenly sampled" means that a same number of video frames intervene or elapse between each sampled video frame and a next sampled video frame. In other words, every "n"-th video frame is sampled. Moreover, in various embodiments, the sampling frequency is automatically updated. In other words, the value of "n" may be kept as a variable during execution of the method 300 and may be updated at block 304 based on the details of the specific implementation, including the dynamics of the particular video being analyzed.

At block 306, each sampled video frame is analyzed using a CNN model to determine whether the sampled video frame includes one or more high-relevance regions. The CNN model is configured to intelligently identify the high-relevance region(s) based on a relative likelihood of each region of the sampled video frame being more relevant to users than other regions of the sampled video frame. Moreover, at block 308, for each sampled video frame including high-relevance region(s), the coordinates of the high-relevance region(s) are extracted using the CNN model. In various embodiments, the coordinates are extracted as rectangle or square coordinates, e.g., using a bounding box approach. For example, referring to the exemplary implementation of FIGS. 2A-C, the rectangle coordinates (35,40, 500,600) are extracted from the video frame 202 since those coordinates encompass the statistical news data region 204 within the video frame 202.

In various embodiments, the CNN model is an R-CNN model. In such embodiments, the R-CNN model is used to intelligently identify any high-relevance region(s) within each video frame in a context-aware manner. Specifically, the R-CNN model functions as a feature extractor, resulting in the generation of a dense layer of features as well as the identification of one or more objects within the video frame. Candidate region proposals are then generated for the object(s) identified within the video frame. The dense layer of features and the candidate region proposals are then fed to a corresponding support vector machine (SVM), which classifies the presence of one or more high-relevance object(s). In addition to predicting the presence of such high-relevance object(s), the R-CNN model also extracts coordinates for the high-relevance region(s) corresponding to such high-relevance object(s). Furthermore, in some embodiments, the R-CNN model applies a number of offset values (e.g., four offset values) to the extracted coordinates (e.g., including bounding boxes that define the high-relevance region(s)), thus increasing the precision of the extracted coordinates.

During runtime, the trained R-CNN model is applied to the video frames as described with respect to blocks 306 and 308, resulting in the output of the extracted coordinates for any high-relevance region(s) within each sampled video frame. The extracted coordinates are then applied to all video frames occurring between the sampled video frame and the next sampled video frame. In other words, the extracted coordinates for the "n"-th video frame are applied to all subsequent video frames until reaching the "n+1"-th video frame, at which point the extracted coordinates for the "n+1"-th video frame are applied until reaching the "n+2"-th video frame, and so on.

At block 310, for each sampled video frame including high-relevance region(s) and each intervening video frame between the sampled video frame and a next sampled video frame, a minimum frame quality is set for the extracted coordinates. In other words, this includes identifying the extracted coordinates for the "n"-th video frame and then applying the minimum frame quality to those coordinates within the "n"-th video frame and all subsequent video frames until reaching the "n+1"-th video frame. This process is then repeated for each set of video frames. As a result, the high-relevance region(s) within each set of video frames are flagged with instructions to maintain the minimum frame quality for such region(s), even when the overall video is being streamed at a lower frame quality.

Furthermore, in various embodiments, this includes saving the video with the minimum frame quality settings for subsequent streaming. Additionally or alternatively, in some embodiments, this includes applying the minimum frame quality settings to the video frames in real-time such that the video can be streamed live or in real-time at block 312.

At block 312, the video is streamed (e.g., on one or more remote computing systems) with internally-variable frame quality by buffering the extracted coordinates within the video frames with the minimum frame quality, while buffering remaining coordinates within the video frames with a lower frame quality. As described above, this may include streaming the video in real-time or streaming the video after it has already been saved with the internally-variable frame quality, depending on the details of the particular implementation.

The block diagram of FIG. 3 is not intended to indicate that the blocks of the method 300 are to be executed in any particular order, or that all of the blocks of the method 300 are to be included in every case. Moreover, any number of additional blocks may be included within the method 300, depending on the details of the specific implementation. For example, in various embodiments, the method 300 also includes training the CNN model (e.g., the R-CNN model) prior to executing the other blocks of the method 300. As an example, in the case of a news-oriented embodiment, around 200 to around 300 news videos may be taken from various channels. The high-relevance region(s) within the corresponding video frames may then be identified and used as input to the CNN model, which is trained to output the coordinates of the high-relevance region(s).

Furthermore, in various embodiments, the method 300 includes activating an internally-variable frame quality mode of a video streaming application based at least on (e.g., in response to) user input received via a GUI element provided by the video streaming application, where the activation of the internally-variable frame quality mode causes the video to be streamed with the internally-variable frame quality. Moreover, in such embodiments, the method 300 may also include deactivating the internally-variable frame quality mode of the video streaming application based at least on (e.g., in response to) additional user input received via the GUI element, where the deactivation of the internally-variable frame quality mode causes the entire video to be streamed with a single, user-selectable (or automatically-selectable) frame quality that does not vary based on the presence of one or more high-relevance regions within the corresponding video frames.

The internally-variable video frame quality techniques described herein provide numerous advantages over conventional approaches. As an example, the present techniques provide for the streaming of videos with internally-variable frame quality based on the intelligent identification of high-relevance regions, thus enabling user devices to utilize less internet data to stream videos without sacrificing the ability to discern information that is relevant/important to users. As another example, the present techniques provide a user-selectable internally-variable frame quality mode, which enables individual users to determine when it is desirable to save internet data by only increasing the frame quality for the most relevant regions of the video frames. As another example, the present techniques utilize a convolutional neural network to identify and extract the high-relevance regions, which enables the high-relevance regions to be automatically determined without direct input from users. As a result, the present techniques provide savings in terms of cost, time, and data, while also delivering an improved viewing experience for users. As yet another example, the present techniques enable real-time streaming of videos with internally-variable frame quality, thus allowing the present techniques to be utilized for live videos, such as videos of meetings, news, sports, presentations, and the like. Furthermore, as another example, the present techniques provide a seamless viewing experience by automatically buffering different regions or portions of video frames with different frame qualities, without interrupting the streaming of the video.

Figure 4:
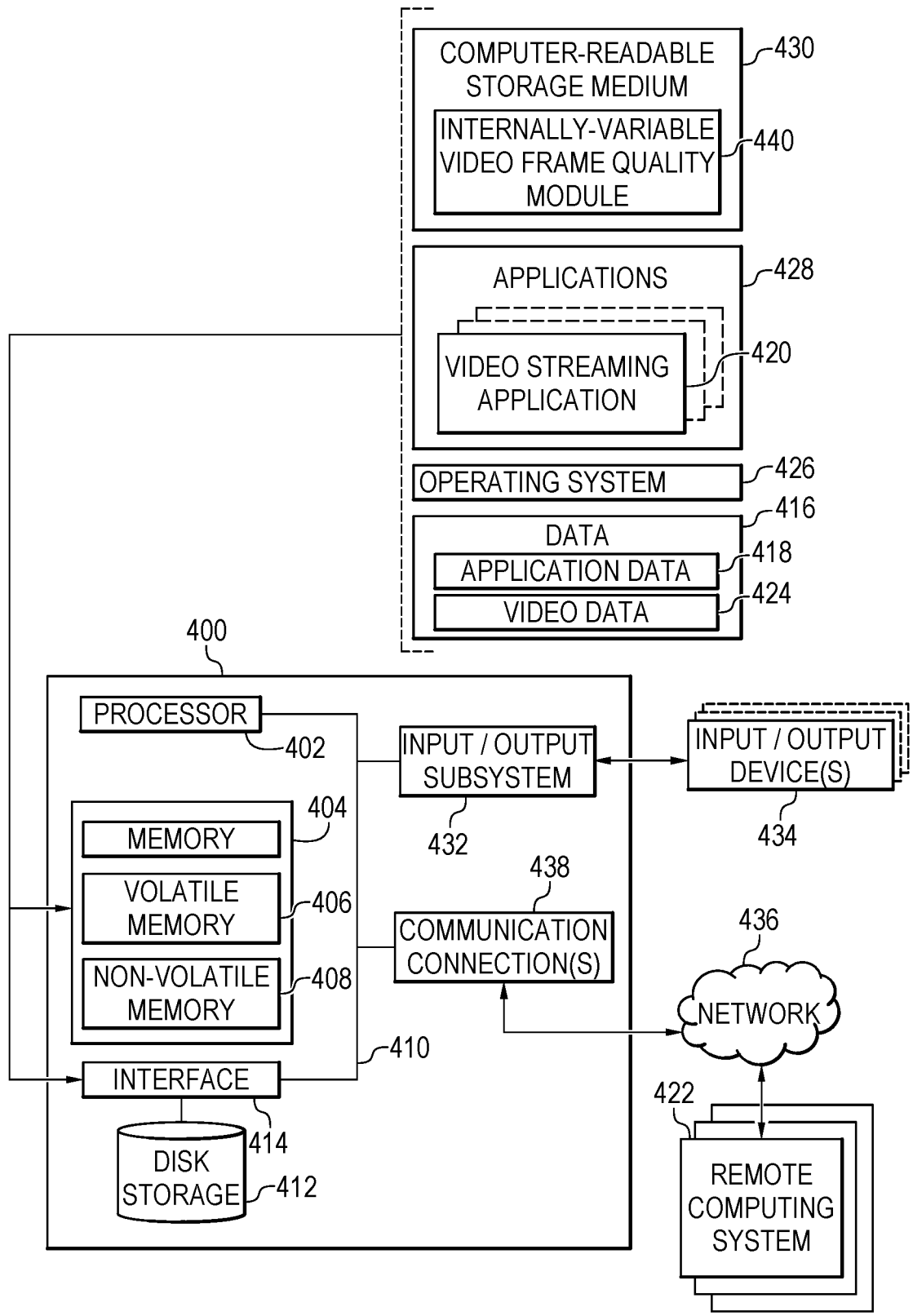
FIG. 4 is a block diagram of an exemplary computing system for implementing the internally-variable video frame quality techniques described herein.

FIG. 4 is a block diagram of an exemplary computing system 400 for implementing the internally-variable video frame quality techniques described herein. The exemplary computing system 400 includes a processor 402 and a memory 404. The processor 402 may include any suitable type of processing unit or device, such as, for example, a single-core processor, a multi-core processor, a computing cluster, or any number of other configurations. Moreover, the processor 402 may include an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combinations thereof, designed to perform the functions described herein.

The memory 404 typically (but not always) includes both volatile memory 406 and non-volatile memory 408. The volatile memory 406 retains or stores information so long as the memory is supplied with power. By contrast, the non-volatile memory 408 is capable of storing (or persisting) information even when a power supply is not available. The volatile memory 406 may include, for example, RAM (e.g., synchronous RAM (SRAM), dynamic RAM (DRAM), synchronous dynamic RAM (SDRAM), and the like) and CPU cache memory. The nonvolatile memory 408 may include, for example, read-only memory (ROM) (e.g., programmable ROM (PROM), electrically programmable ROM (EPROM), electrically erasable ROM (EEROM) or the like), flash memory, nonvolatile random-access memory (RAM), solid-state memory devices, memory storage devices, and/or memory cards.

The processor 402 and the memory 404, as well as other components of the computing system 400, are interconnected by way of a system bus 410. The system bus 410 can be implemented using any suitable bus architecture known to those skilled in the art.

According to the embodiment shown in FIG. 4, the computing system 400 also includes a disk storage 412. The disk storage 412 may include any suitable removable/non-removable, volatile/non-volatile storage component or device. For example, the disk storage 412 may include, but is not limited to, a magnetic disk drive, floppy disk drive, tape drive, Jaz drive, Zip drive, LS-210 drive, flash memory card, memory stick, or the like. In addition, the disk storage 412 may include storage media separately from (or in combination with) other storage media including, but not limited to, an optical disk drive, such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 412 to the system bus 410, a removable or non-removable interface is typically used, such as interface 414 shown in FIG. 4.

In various embodiments, the disk storage 412 and/or the memory 404 function as one or more databases that are used to store data 416 relating to the techniques described herein. Such data 416 may include, but are not limited to, application data 418 obtained from the execution of one or more video streaming application(s) 420 on various remote computing systems 422. According to embodiments described herein, such application data 418 may include data relating to an internally-variable frame quality functionality of the video streaming application(s) 420, including specific data that enables the activation/deactivation of an internally-variable frame quality mode, as described herein. Such data 416 may also include, but are not limited to, video data 424 corresponding to any number of videos that are streamed using the video streaming application(s) 420. According to embodiments described herein, such video data 424 may include data relating to intelligently-identified high-relevance region(s) within any of the videos.

Those skilled in the art will appreciate that FIG. 4 describes software that acts as an intermediary between a user of the computing system 400 and the basic computing resources described with respect to the operating environment of the computing system 400. Such software includes an operating system 426. The operating system 426, which may be stored on the disk storage 412, acts to control and allocate the computing resources of the computing system 400. Moreover, system applications 428, including the video streaming application(s) 420, take advantage of the management of the computing resources by the operating system 426 through one or more program modules stored within a computer-readable storage medium (or media) 430, as described further herein.

The computing system 400 also includes an input/output (I/O) subsystem 432. The I/O subsystem 432 includes a set of hardware, software, and/or firmware components that enable or facilitate inter-communication between the user of the computing system 400 and the processor 402 of the computing system 400. During operation of the computing system 400, the I/O subsystem 432 enables the user to interact with the computing system 400 through one or more I/O devices 434. Such I/O devices 434 may include any number of input devices or channels, such as, for example, one or more touchscreen/haptic input devices, one or more buttons, one or more pointing devices, one or more accessories, one or more audio input devices, and/or one or more video input devices, such as a camera. Furthermore, in some embodiments the one or more input devices or channels connect to the processor 402 through the system bus 410 via one or more interface ports (not shown) integrated within the I/O subsystem 432. Such interface ports may include, for example, a serial port, a parallel port, a game port, and/or a universal serial bus (USB).

In addition, such I/O devices 434 may include any number of output devices or channels, such as, for example, one or more audio output devices, one or more haptic feedback devices, and/or one or more display devices. Such output devices or channels may use some of the same types of ports as the input devices or channels. Thus, for example, a USB port may be used to both provide input to the computing system 400 and to output information from the computing system 400 to a corresponding output device. Moreover, in some embodiments, the one or more output devices or channels are accessible via one or more adapters (not shown) integrated within the I/O subsystem 432.

In various embodiments, the computing system 400 is communicably coupled to any number of remote computing systems 422. The remote computing system(s) 422 may include, for example, one or more personal computers (e.g., desktop computers, laptop computers, or the like), one or more tablets, one or more mobile devices (e.g., mobile phones), one or more network PCs, and/or one or more workstations. As an example, in some embodiments, the computing system 400 is (or includes) an application service provider server hosting the video streaming application(s) 420 in a networked environment using logical connections to the remote computing systems 422. In such embodiments, the computing system 400 provides for the execution of the video streaming application(s) 420 on the remote computing systems 422 with the enhanced functionality provided by the internally-variable video frame quality techniques described herein.

In various embodiments, the remote computing systems 422 are logically connected to the computing system 400 through a network 436 and then connected via a communication connection 438, which may be wireless. The network 436 encompasses wireless communication networks, such as local-area networks (LAN) and wide-area networks (WAN). LAN technologies include Fiber Distributed Data Interface (FDDI), Copper Distributed Data Interface (CDDI), Ethernet, Token Ring, and the like. WAN technologies include, but are not limited to, point-to-point links, circuit switching networks like Integrated Services Digital Networks (ISDN) and variations thereon, packet switching networks, and Digital Subscriber Lines (DSL).

The communication connection 438 includes the hardware/software employed to connect the network 436 to the bus 410. While the communication connection 438 is shown for illustrative clarity as residing inside the computing system 400, it can also be external to the computing system 400. The hardware/software for connection to the network 436 may include, for example, internal and external technologies, such as mobile phone switches, modems including regular telephone grade modems, cable modems and DSL modems, ISDN adapters, and/or Ethernet cards.

As described above, the system applications 428, such as the video streaming application(s) 420, take advantage of the management of the computing resources by the operating system 426 through one or more program modules stored within the computer-readable storage medium (or media) 430. In some embodiments, the computer-readable storage medium 430 is integral to the computing system 400, in which case it may form part of the memory 404 and/or the disk storage 412. In other embodiments, the computer-readable storage medium 430 is an external device that is connected to the computing system 400 when in use.

In various embodiments, the one or more program modules stored within the computer-readable storage medium 430 include program instructions or code that may be executed by the processor 402 to perform various operations. In various embodiments, such program modules include, but are not limited to, an internally-variable video frame quality module 440 that causes the processor 402 to perform operations that result in the execution of the internally-variable video frame quality techniques provided herein, as described with respect to the method 300 of FIG. 3, for example. In particular, in various embodiments, the execution of the video streaming application(s) 420 in conjunction with the internally-variable video frame quality module 440 may result in the display of streaming videos including video frames with internally-variable frame quality, where such streaming videos may be displayed with respect to a video GUI that is surfaced on the displays corresponding to the remote computing systems 422, as described further with respect to FIG. 5.

It is to be understood that the block diagram of FIG. 4 is not intended to indicate that the computing system 400 is to include all of the components shown in FIG. 4. Rather, the computing system 400 can include fewer or additional components not illustrated in FIG. 4 (e.g., additional applications, additional modules, additional memory devices, additional network interfaces, etc.). Furthermore, any of the functionalities of the one or more program modules/sub-modules may be partially, or entirely, implemented in hardware and/or in the processor 402. For example, the functionality may be implemented with an application specific integrated circuit, in logic implemented in the processor 402, or in any other device.

Figure 5:
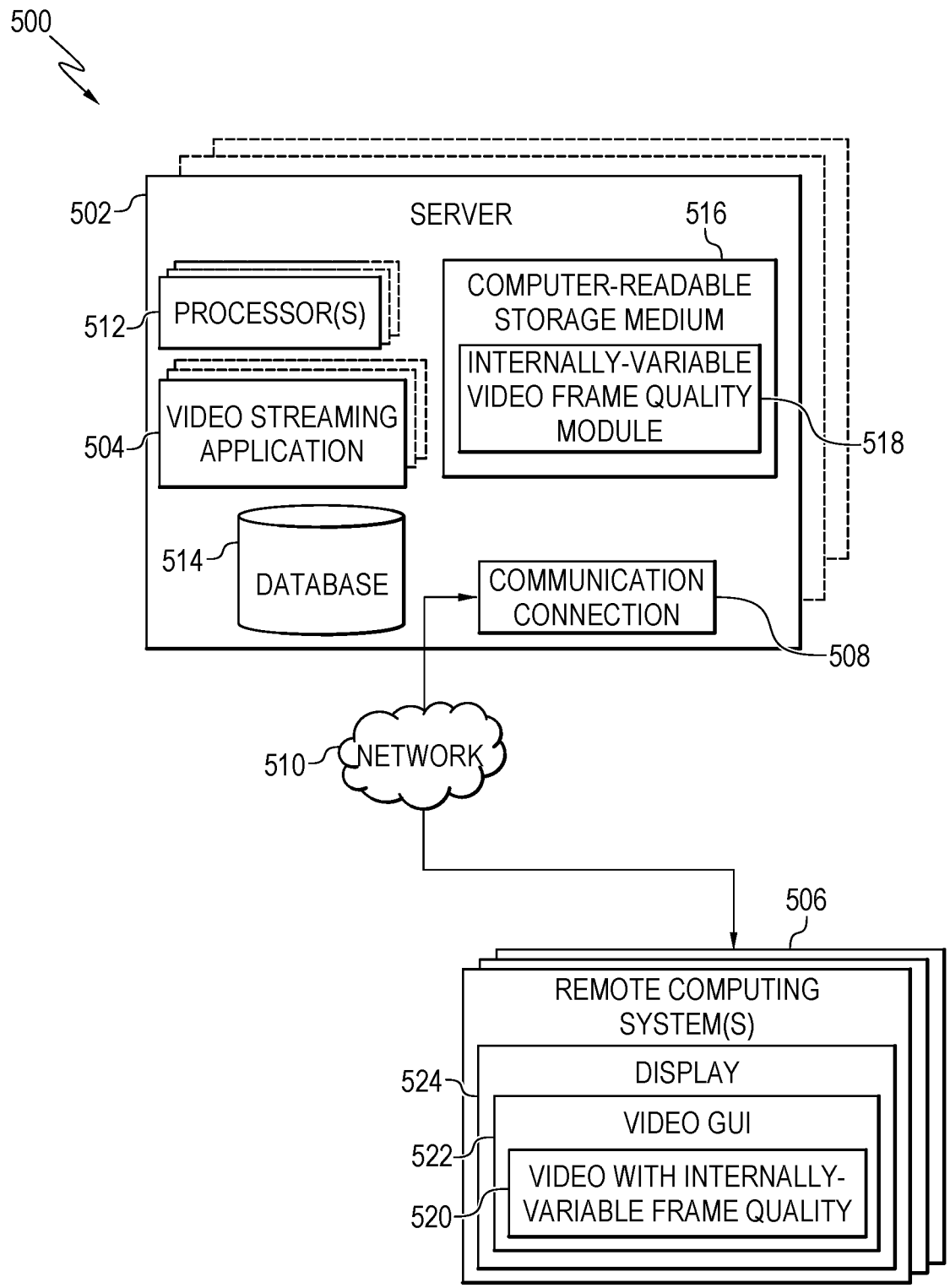
FIG. 5 is a block diagram of an exemplary network environment for implementing the internally-variable video frame quality techniques described herein.

FIG. 5 is a block diagram of an exemplary network environment 500 for implementing the internally-variable video frame quality techniques described herein. As shown in FIG. 5, the network environment 500 includes one or more server(s) 502 that provide for the execution of the techniques described herein. In various embodiments, the server(s) 502 are operated by an application service provider that provides for the execution of one or more video streaming application(s) 504. In addition, the network environment 500 may include any number of remote computing systems 506.

In various embodiments, the server(s) 502 are configured to communicate with the remote computing system(s) 506 via a communication connection 508 and a corresponding network 510 (e.g., using one or more application programming interfaces (APIs) corresponding to the video streaming application(s) 504, for example). The network 510 may include, but is not limited to, a cellular network, a point-to-point dial up connection, a satellite network, the Internet, a local area network (LAN), a wide area network (WAN), and/or a Wi-Fi network. Such networks are widely used to connect various types of network elements, such as routers, servers, and gateways. Moreover, those skilled in the art will appreciate that the present techniques may also be practiced in a multi-network environment having various connected public and/or private networks. Furthermore, those skilled in the art will appreciate that communication networks can take several different forms and use several different communication protocols. For example, in some embodiments, the present techniques may be practiced in a distributed computing environment in which tasks are performed by remote processing devices that are linked through a communications network. In a distributed computing environment, program modules can be located in both local and remote computer-readable storage media.

In various embodiments, the server(s) 502 include one or more processors 512, as well as a database 514 that functions as a repository for the data that is generated and maintained according to embodiments described herein. Such data may include, but are not limited to, application data and video data, as described with respect to FIG. 4. In addition, the server(s) 502 include a computer-readable storage medium 516 including an internally-variable video frame quality module 518 that directs the processor(s) 512 to provide for the streaming of a video 520 with internally-variable frame quality during the execution of the video streaming application(s) 504 on the remote computing system(s) 506.

In some embodiments, the server(s) 502 maintain the code corresponding to the video streaming application(s) 504. In such embodiments, the server(s) 502 may host the video streaming application(s) 504 on the remote computing system(s) 506 via the network 510 (e.g., using the corresponding APIs). In particular, the server(s) 502 provide for execution of the video streaming application(s) 504 on the remote computing system(s) 506 by surfacing a video GUI 522 on a display 524 corresponding to each remote computing system 506. The video 520 with the internally-variable frame quality may then be streamed with respect to the video GUI 522, as described herein.

It is to be understood that the simplified block diagram of FIG. 5 is not intended to indicate that the network environment 500 is to include all of the components shown in FIG. 5. Rather, the network environment 500 may include different components and/or additional components not illustrated in FIG. 5. For example, in practice, the server(s) 502 will include a number of additional components not depicted in the simplified block diagram of FIG. 5, as described with respect to the computing system 400 of FIG. 4, for example.

Figure 6:
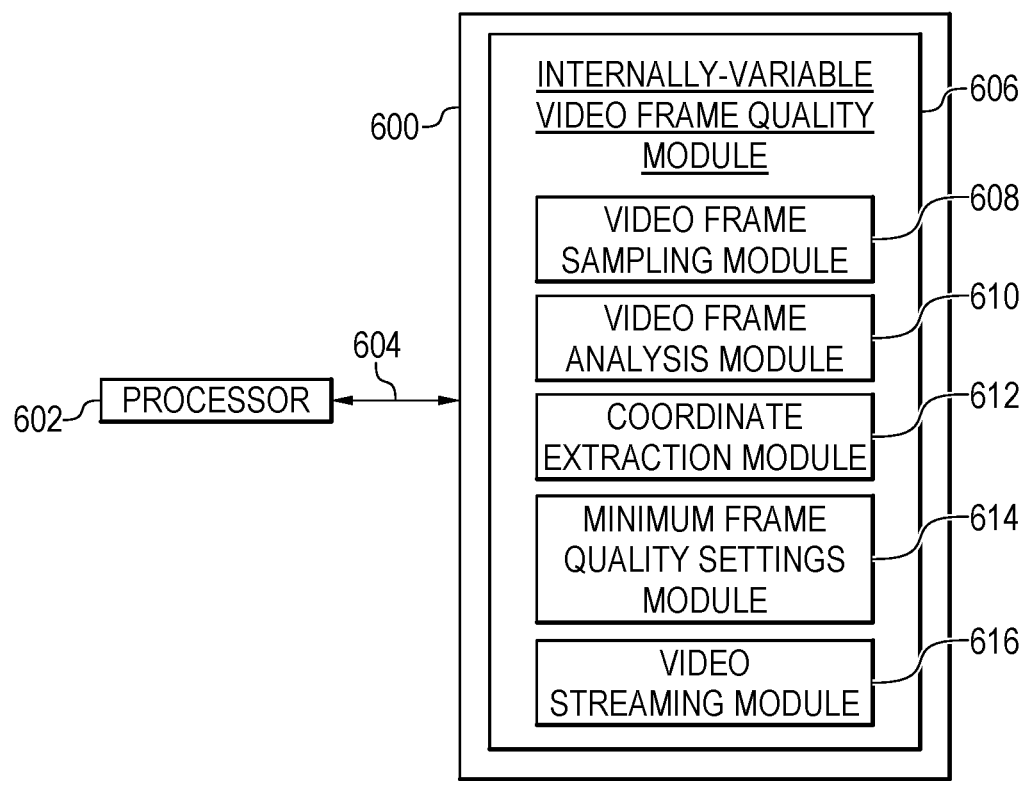
FIG. 6 is a block diagram of an exemplary computer-readable storage medium for implementing the internally-variable video frame quality techniques described herein.

FIG. 6 is a block diagram of an exemplary computer-readable storage medium 600 for implementing the internally-variable video frame quality techniques described herein. In various embodiments, the computer-readable storage medium 600 is accessed by a processor 602 over a computer interconnect 604. For example, in some embodiments, the computer-readable storage medium 600 is the same as, or similar to, the computer-readable storage medium described with respect to the computing system 400 of FIG. 4 and/or the network environment 500 of FIG. 5.

In various embodiments, the computer-readable storage medium 600 includes code (i.e., computer-executable instructions) to direct the processor 602 to perform the operations of the present techniques. Such code may be stored within the computer-readable storage medium 600 in the form of program modules, where each module includes a set of computer-executable instructions that, when executed by the processor 602, cause the processor 602 to perform a corresponding set of operations. In particular, in various embodiments, the computer-readable storage medium 600 includes an internally-variable video frame quality module 606 that directs the processor 602 to perform the internally-variable video frame quality techniques described herein. Moreover, in various embodiments, the internally-variable video frame quality module 606 accomplishes this via one or more sub-modules. Such sub-modules may include, but are not limited to, a video frame sampling module 608 that directs the processor 602 to evenly sample the video frames within a video, a video frame analysis sub-module 610 that directs the processor 602 to analyze each sampled video frame using a CNN model (e.g., an R-CNN model) to determine whether the sampled video frame include one or more high-relevance regions; a coordinate extraction sub-module 612 that directs the processor 602 to extract coordinates of the high-relevance region(s) within each sampled video frame that has been determined to include high-relevance region(s); a minimum frame quality settings sub-module 614 that directs the processor 602 to set a minimum frame quality for the extracted coordinates within each sampled video frame and each intervening video frame between the sampled video frame and a next sampled video frame; and a video streaming sub-module 616 that directs the processor 602 to stream the video with an internally-variable frame quality by buffering the extracted coordinates within the video frames with the minimum frame quality, while buffering remaining coordinates within the video frames with a lower frame quality, as described herein.

Moreover, those skilled in the art will appreciate that any suitable number of the modules shown in FIG. 6 may be included within the computer-readable storage medium 600. Furthermore, any number of additional modules/sub-modules not shown in FIG. 6 may be included within the computer-readable storage medium 600, depending on the details of the specific implementation.

The present techniques may be susceptible to various modifications and alternative forms, including (but not limited to) those described in the following examples:

Example 1 is a method for streaming a video with internally-variable frame quality. The method is implemented in a computing system including a processor. The method includes accessing, via the processor, a video including video frames and evenly sampling the video frames. The method also includes, for each sampled video frame, analyzing the sampled video frame using a CNN model to determine whether the sampled video frame includes a high-relevance region, where the CNN model is configured to intelligently identify the high-relevance region based on a relative likelihood of each region of the sampled video frame being more relevant to a user than other regions of the sampled video frame. The method also include, for each sampled video frame including the high-relevance region, extracting coordinates of the high-relevance region using the CNN model. The method further includes, for each sampled video frame including the high-relevance region and each intervening video frame between the sampled video frame and a next sampled video frame, setting a minimum frame quality for the extracted coordinates, as well as streaming the video with an internally-variable frame quality by buffering the extracted coordinates within the video frames with the minimum frame quality, while buffering remaining coordinates within the video frames with a lower frame quality.

Example 2 includes the method of example 1, including or excluding optional features. In this example, the CNN model includes an R-CNN model.

Example 3 includes the method of example 2, including or excluding optional features. In this example, analyzing each sampled video frame and extracting the coordinates of the high-relevance region within the sampled video frame using the R-CNN model includes: applying the R-CNN model to the sampled video frame; generating a layer of features corresponding to the sampled video frame; identifying objects within the sampled video frame; generating candidate region proposals for the objects identified within the sampled video frame; classifying a presence of a high-relevance object based on the generated layer of features and the generated candidate region proposals; and extracting the coordinates of the high-relevance region corresponding to the high-relevance object within the sampled video frame.

Example 4 includes the method of example 3, including or excluding optional features. In this example, the method further includes automatically applying offset values to the extracted coordinates to increase a precision of the extracted coordinates.

Example 5 includes the method of any one of examples 1 to 4, including or excluding optional features. In this example, the method further includes automatically updating a sampling frequency for evenly sampling the video frames.

Example 6 includes the method of any one of examples 1 to 5, including or excluding optional features. In this example, the video includes a live video, and the method is executed in real-time.

Example 7 includes the method of any one of examples 1 to 6, including or excluding optional features. In this example, the method includes storing the video with internally-variable frame quality settings for subsequent streaming.

Example 8 includes the method of any one of examples 1 to 7, including or excluding optional features. In this example, the method includes activating an internally-variable frame quality mode of a video streaming application based at least on user input received via a GUI element provided by the video streaming application, where the activation of the internally-variable frame quality mode causes the video to be streamed with the internally-variable frame quality.

Example 9 includes the method of any one of examples 1 to 8, including or excluding optional features. In this example, the method includes training the CNN model prior to accessing the video.

Example 10 is a computing system. The computing system includes a processor and a computer-readable storage medium operatively coupled to the processor. The computer-readable storage medium includes computer-executable instructions that, when executed by the processor, cause the processor to access a video including video frames, evenly sample the video frames, and for each sampled video frame, analyze the sampled video frame using a CNN model to determine whether the sampled video frame includes a high-relevance region, where the CNN model is configured to intelligently identify the high-relevance region based on a relative likelihood of each region of the sampled video frame being more relevant to a user than other regions of the sampled video frame. The computer-readable storage medium also includes computer-executable instructions that, when executed by the processor, cause the processor to, for each sampled video frame including the high-relevance region, extract coordinates of the high-relevance region using the CNN model and, for each sampled video frame including the high-relevance region and each intervening video frame between the sampled video frame and a next sampled video frame, set a minimum frame quality for the extracted coordinates. The computer-readable storage medium further includes computer-executable instructions that, when executed by the processor, cause the processor to stream the video with an internally-variable frame quality by buffering the extracted coordinates within the video frames with the minimum frame quality, while buffering remaining coordinates within the video frames with a lower frame quality.

Example 11 includes the computing system of example 10, including or excluding optional features. In this example, the CNN model includes an R-CNN model.

Example 12 includes the computing system of example 11, including or excluding optional features. In this example, the computer-readable storage medium includes computer-executable instructions that, when executed by the processor, cause the processor to analyze each sampled video frame and extract the coordinates of the high-relevance region within the sampled video frame using the R-CNN model by: applying the R-CNN model to the sampled video frame; generating a layer of features corresponding to the sampled video frame; identifying objects within the sampled video frame; generating candidate region proposals for the objects identified within the sampled video frame; classifying a presence of a high-relevance object based on the generated layer of features and the generated candidate region proposals; and extracting the coordinates of the high-relevance region corresponding to the high-relevance object within the sampled video frame.

Example 13 includes the computing system of example 12, including or excluding optional features. In this example, the computer-readable storage medium includes computer-executable instructions that, when executed by the processor, cause the processor to automatically apply offset values to the extracted coordinates to increase a precision of the extracted coordinates.

Example 14 includes the computing system of any one of examples 10 to 13, including or excluding optional features. In this example, the computer-readable storage medium includes computer-executable instructions that, when executed by the processor, cause the processor to automatically update a sampling frequency for evenly sampling the video frames.

Example 15 includes the computing system of any one of examples 10 to 14, including or excluding optional features. In this example, the computer-readable storage medium includes computer-executable instructions that, when executed by the processor, cause the processor to activate an internally-variable frame quality mode of a video streaming application based at least on user input received via a GUI element provided by the video streaming application, where the activation of the internally-variable frame quality mode causes the video to be streamed with the internally-variable frame quality.

Example 16 is a computer-readable storage medium. The computer-readable storage medium includes computer-executable instructions that, when executed by a processor, cause the processor to access a video including video frames, evenly sample the video frames, and for each sampled video frame, analyze the sampled video frame using a convolutional neural network (CNN) model to determine whether the sampled video frame includes a high-relevance region, where the CNN model is configured to intelligently identify the high-relevance region based on a relative likelihood of each region of the sampled video frame being more relevant to a user than other regions of the sampled video frame. The computer-readable storage medium also includes computer-executable instructions that, when executed by the processor, cause the processor to, for each sampled video frame including the high-relevance region, extract coordinates of the high-relevance region using the CNN model and, for each sampled video frame including the high-relevance region and each intervening video frame between the sampled video frame and a next sampled video frame, set a minimum frame quality for the extracted coordinates. The computer-readable storage medium further includes computer-executable instructions that, when executed by the processor, cause the processor to stream the video with an internally-variable frame quality by buffering the extracted coordinates within the video frames with the minimum frame quality, while buffering remaining coordinates within the video frames with a lower frame quality.

Example 17 includes the computer-readable storage medium of example 16, including or excluding optional features. In this example, the CNN model includes an R-CNN model.

Example 18 includes the computer-readable storage medium of example 17, including or excluding optional features. In this example, the computer-readable storage medium includes computer-executable instructions that, when executed by the processor, cause the processor to analyze each sampled video frame and extract the coordinates of the high-relevance region within the sampled video frame using the R-CNN model by: applying the R-CNN model to the sampled video frame; generating a layer of features corresponding to the sampled video frame; identifying objects within the sampled video frame; generating candidate region proposals for the objects identified within the sampled video frame; classifying a presence of a high-relevance object based on the generated layer of features and the generated candidate region proposals; and extracting the coordinates of the high-relevance region corresponding to the high-relevance object within the sampled video frame.

Example 19 includes the computer-readable storage medium of any one of examples 16 to 18, including or excluding optional features. In this example, the computer-readable storage medium includes computer-executable instructions that, when executed by the processor, cause the processor to automatically update a sampling frequency for evenly sampling the video frames.

Example 20 includes the computer-readable storage medium of any one of examples 16 to 19, including or excluding optional features. In this example, the computer-readable storage medium includes computer-executable instructions that, when executed by the processor, cause the processor to activate an internally-variable frame quality mode of a video streaming application based at least on user input received via a GUI element provided by the video streaming application, where the activation of the internally-variable frame quality mode causes the video to be streamed with the internally-variable frame quality.

It should be noted that, while the methods and processes described herein are generally expressed in regard to discrete steps, these steps should be viewed as being logical in nature and may or may not correspond to any specific actual and/or discrete steps of a given implementation. In addition, the order in which these steps are presented in the various methods and processes, unless otherwise indicated, should not be construed as the only order in which the steps may be carried out. Moreover, in some instances, some of these steps may be combined and/or omitted. Those skilled in the art will recognize that the logical presentation of steps is sufficiently instructive to carry out aspects of the claimed subject matter irrespective of any particular development or coding language in which the logical instructions/steps are encoded.

Of course, while the methods and processes described herein include various novel features of the disclosed subject matter, other steps (not listed) may also be carried out in the execution of the subject matter set forth in these methods and processes. Those skilled in the art will appreciate that the logical steps of these methods and processes may be combined together or split into additional steps. Steps of the above-described methods and processes may be carried out in parallel or in series. Often, but not exclusively, the functionality of a particular method or process is embodied in software (e.g., applications, system services, libraries, and the like) that is executed on one or more processors of computing systems. Additionally, in various embodiments, all or some of the various methods and processes may also be embodied in executable hardware modules including, but not limited to, system on chips (SoC's), codecs, specially designed processors and/or logic circuits, and the like, on a computing system.

As suggested above, each method or process described herein is typically embodied within computer-executable instruction (or code) modules including individual routines, functions, looping structures, selectors and switches (such as if-then and if-then-else statements), assignments, arithmetic computations, and the like, that, in execution, configure a computing system to operate in accordance with the particular method or process. However, as suggested above, the exact implementation in executable statement of each of the methods or processes is based on various implementation configurations and decisions, including programming languages, compilers, target processors, operating environments, and the linking or binding operation. Those skilled in the art will readily appreciate that the logical steps identified in these methods and processes may be implemented in any number of ways and, thus, the logical descriptions set forth above are sufficiently enabling to achieve similar results.

While various novel aspects of the disclosed subject matter have been described, it should be appreciated that these aspects are exemplary and should not be construed as limiting. Variations and alterations to the various aspects may be made without departing from the scope of the disclosed subject matter.

In particular and in regard to the various functions performed by the above described components, devices, circuits, systems and the like, the terms (including a reference to a "means") used to describe such components are intended to correspond, unless otherwise indicated, to any component which performs the specified function of the described component, e.g., a functional equivalent, even though not structurally equivalent to the disclosed structure, which performs the function in the herein illustrated exemplary aspects of the claimed subject matter. In this regard, it will also be recognized that the innovation includes a system as well as a computer-readable storage media having computer-executable instructions for performing the acts and events of the various methods of the claimed subject matter.

There are multiple ways of implementing the claimed subject matter, e.g., an appropriate API, tool kit, driver code, operating system, control, standalone or downloadable software object, etc., which enables applications and services to use the techniques described herein. The claimed subject matter contemplates the use from the standpoint of an API (or other software object), as well as from a software or hardware object that operates according to the techniques set forth herein. Thus, various implementations of the claimed subject matter described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and additional components, and according to various permutations and combinations of the foregoing. Sub-components can also be implemented as components communicatively coupled to other components rather than included within parent components (hierarchical).

Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the claimed subject matter may have been disclosed with respect to one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A method for streaming a video with internally-variable frame quality, wherein the method is implemented via a computing system comprising a processor, and wherein the method comprises:
   accessing, via the processor, a video comprising a sequence of video frames;
   evenly sampling at least a first video frame in the sequence of video frames and a second video frame in the sequence of video frames, wherein unsampled intermediate video frame(s) are positioned between the first sampled video frame and the second sampled video frame in the sequence of video frames;
   analyzing regions of the first sampled video frame using a convolutional neural network (CNN) model to identify a high-relevance region comprising textual information, the high-relevance region being more relevant to a user than low-relevance region(s) within the first sampled video frame;
   extracting coordinates of the high-relevance region within the first sampled video frame using the CNN model;
   using the coordinates extracted from the first sampled video frame to identify corresponding high-relevance region(s) within the unsampled intermediate video frame(s), wherein the high-relevance region within the first sampled video frame and the corresponding high-relevance region(s) of the unsampled intermediate video frame(s) have identical coordinates; and
   streaming the video such that the streamed video has an internally-variable frame quality, wherein streaming the video comprises buffering the high-relevance region of the first sampled video frame and the corresponding high-relevance region(s) of the unsampled intermediate video frame(s) at a higher resolution than the low-relevance region(s) of the first sampled video frame.

2. The method of claim 1, wherein the CNN model comprises a region-based CNN (R-CNN) model.

3. The method of claim 2, wherein analyzing regions of the first sampled video frame using the CNN model to identify the high-relevance region comprises:
   applying the R-CNN model to the first sampled video frame;
   generating a layer of features corresponding to the first sampled video frame;
   identifying objects within the first sampled video frame;
   generating candidate region proposals for the objects identified within the first sampled video frame;

classifying a presence of a high-relevance object based on the generated layer of features and the generated candidate region proposals; and extracting the coordinates of the high-relevance region corresponding to the high-relevance object within the first sampled video frame.

4. The method of claim 3, further comprising automatically applying offset values to the extracted coordinates to increase a precision of the extracted coordinates.

5. The method of claim 1, further comprising automatically updating a sampling frequency for evenly sampling video frames within the sequence of video frames.

6. The method of claim 1, wherein the video comprises a live video, and wherein the method is executed in real-time.

7. The method of claim 1, further comprising storing the video with internally-variable frame quality settings for subsequent streaming.

8. The method of claim 1, further comprising activating an internally-variable frame quality mode of a video streaming application based at least on user input received via a GUI element provided by the video streaming application, wherein activation of the internally-variable frame quality mode causes the video to be streamed with the internally-variable frame quality.

9. The method of claim 1, further comprising training the CNN model prior to accessing the video.

10. The method of claim 1, wherein the extracted coordinates identify the high-relevance region within the first sampled video frame as well as corresponding high-relevance region(s) within the unsampled intermediate video frame(s).

11. The method of claim 10, wherein streaming the video based on the extracted coordinates further comprises buffering the corresponding high-relevance region(s) of the unsampled intermediate video frame(s) at a higher resolution than the low-relevance region(s) of the first sampled video frame.

12. The method of claim 1, wherein the coordinates extracted from the first sampled video frame are used to identify the corresponding high-relevance region(s) within the unsampled intermediate video frame(s) without comparing the unsampled intermediate video frame(s) with the first sampled video frame for purposes of object tracking.

13. A computing system, comprising:
a processor; and
a computer-readable storage medium operatively coupled to the processor, the computer-readable storage medium comprising computer-executable instructions that, when executed by the processor, cause the processor to:
access a video comprising a sequence of video frames;
evenly sample at least a first video frame in the sequence of video frames and a second video frame in the sequence of video frames, wherein unsampled intermediate video frame(s) are positioned between the first sampled video frame and the second sampled video frame in the sequence of video frames;
analyze regions of the first sampled video frame using a convolutional neural network (CNN) model to identify a high-relevance region comprising textual information, the high-relevance region being more relevant to a user than low-relevance region(s) within the first sampled video frame;
extract coordinates of the high-relevance region within the first sampled video frame using the CNN model;
using the coordinates extracted from the first sampled video frame to identify corresponding high-relevance region(s) within the unsampled intermediate video frame(s), wherein the high-relevance region within the first sampled video frame and the corresponding high-relevance region(s) of the unsampled intermediate video frame(s) have identical coordinates; and
stream the video based on the extracted coordinates such that the streamed video has an internally-variable frame quality, wherein the processor streams the video based on the extracted coordinates by buffering the high-relevance region of the first sampled video frame and the corresponding high-relevance region(s) of the unsampled intermediate video frame(s) at a higher resolution than the low-relevance region(s) of the first sampled video frame.

14. The computing system of claim 13, wherein computer-executable instructions further cause the processor to automatically update a sampling frequency for evenly sampling video frames within the sequence of video frames.

15. The computing system of claim 13, wherein computer-executable instructions further cause the processor to store the video with internally-variable frame quality settings for subsequent streaming.

16. The computing system of claim 13, wherein computer-executable instructions further cause the processor to activate an internally-variable frame quality mode of a video streaming application based at least on user input received via a GUI element provided by the video streaming application, wherein activation of the internally-variable frame quality mode causes the video to be streamed with the internally-variable frame quality.

17. The computing system of claim 13, wherein computer-executable instructions further cause the processor to train the CNN model prior to accessing the video.

18. The computing system of claim 13, wherein the extracted coordinates identify the high-relevance region within the first sampled video frame as well as corresponding high-relevance region(s) within the unsampled intermediate video frame(s).

19. The computing system of claim 13, wherein streaming the video based on the extracted coordinates further comprises buffering the corresponding high-relevance region(s) of the unsampled intermediate video frame(s) at a higher resolution than the low-relevance region(s) of the first sampled video frame.

20. A computer-readable storage medium comprising computer-executable instructions that, when executed by a processor, cause the processor to:
access a video comprising a sequence of video frames;
evenly sample at least a first video frame in the sequence of video frames and a second video frame in the sequence of video frames, wherein unsampled intermediate video frame(s), positioned between the first sampled video frame and the second sampled video frame in the sequence of video frames;
analyze regions of the first sampled video frame using a convolutional neural network (CNN) model to identify a high-relevance region comprising textual information, the high-relevance region being more relevant to a user than low-relevance region(s) within the first sampled video frame;
extract coordinates of the high-relevance region within the first sampled video frame using the CNN model;
use the coordinates extracted from the first sampled video frame to identify corresponding high-relevance region(s) within the unsampled intermediate video frame(s), wherein the high-relevance region within the first sampled video frame and the corresponding high-relevance region(s) of the unsampled intermediate video frame(s) have identical coordinates; and stream the video based on the extracted coordinates such that the streamed video has an internally-variable frame quality, wherein the processor streams the video by buffering the high-relevance region of the first sampled video frame and the corresponding high-relevance region(s) of the unsampled intermediate video frame(s) at a higher resolution than the low-relevance region(s) of the first sampled video frame.

\* \* \* \* \*